United States Patent [19]

Mabuchi

[11] 4,322,650
[45] Mar. 30, 1982

[54] SMALL ELECTRIC MOTOR

[75] Inventor: Takaichi Mabuchi, Matsudo, Japan

[73] Assignee: Mabuchi Motor Co. Ltd., Tokyo, Japan

[21] Appl. No.: 98,372

[22] Filed: Nov. 28, 1979

[30] Foreign Application Priority Data

Jun. 12, 1978 [JP] Japan .................. 53-70491

[51] Int. Cl.³ .......................................... H02K 13/06
[52] U.S. Cl. ..................................... 310/220; 310/233
[58] Field of Search .......................... 310/40, 220–225, 310/68 R

[56] References Cited

U.S. PATENT DOCUMENTS

| | | | |
|---|---|---|---|
| 3,322,988 | 5/1967 | Ishikawa et al. | 310/220 |
| 3,456,143 | 7/1969 | Uemura et al. | 310/220 |
| 3,487,248 | 12/1969 | Kaneko et al. | 310/220 |
| 3,488,538 | 1/1970 | Hayashi | 310/220 |
| 3,509,398 | 4/1970 | Treible, Jr. | 310/220 |
| 3,924,148 | 12/1978 | Tachibana et al. | 310/220 |

Primary Examiner—Donovan F. Duggan

[57] ABSTRACT

A small electric motor having a plurality of commutator segments disposed at equal intervals in the angular positional direction on an insulating cylinder fixedly fitted to the rotating shaft of a motor rotor, and brushes for making electrical contact with the commutator segments, wherein reservoirs for holding an electrically conductive mixture are provided by boring the insulating cylinder in such a manner that the reservoirs extend to the adjoining commutator segments, the electrically conductive mixture being injected into the reservoirs so that the mixture is deposited in such a manner that the mixture bridges each commutator segments and covers the intervening portions between the commutator segments, the reservoirs being disposed in the locations at which the commutator segments and the brushes do not contact.

4 Claims, 4 Drawing Figures

SMALL ELECTRIC MOTOR

BACKGROUND OF THE INVENTION

1. Field of the Invention

This invention relates generally to a small electric motor, and more particularly to a small electric motor wherein an electrically conductive mixture is deposited to bridge each commutator segments so as to prevent spark generation while the mixture is prevented from spreading over the sliding contact portions of the commutator segments and the brushes.

2. Description of the Prior Art

Sparks generated between the brushes and commutator segment of a small electric motor have heretofore been the cause of unwanted phenomena such as damages to brushes or commutator segments due to electrical wear, or electrical noises. To prevent such sparks, therefore, various means have been proposed. It is generally recognized that a method of connecting capacitors, linear resistors or non-linear resistors such as varisters across each commutator segment is effective in preventing spark generation. This method, however, involves complicate wiring operations, resulting in higher manufacturing costs and lower productivity. To overcome these problems, the present inventor has already proposed a method to easily quench sparks and suppress electrical noises by interposing an electrically conductive grease between each commutator segment and selecting the electrical resistance value of the electrically conductive grease within a proper range. According to the proposed method, the electrically conductive grease is adapted to cover not only the intervening protions but also the surface of the commutator segments, the grease film on the commutator segment surface being cut by the brushes as the brushes make sliding contact with the commutator segments. However, when carbon brushes are used, this method is not desirable because of deteriorated commutating performances.

SUMMARY OF THE INVENTION

It is the first object of this invention to provide a small electric motor wherein reservoirs for holding an electically conductive mixture are provided by boring the desired locations of an insulating cylinder, to which commutator segments are fixed, in such a manner that the reservoirs extend to the adjoining commutator segments, the electrically conductive mixture being injected into the reservoirs so that the mixture bridges the commutator segments to form desired resistance circuits across each commutator segment so as to quench sparks generated between the brushes and the commutator segments and suppress the associated electrical noises.

It is the second object of this invention to provide a small electric motor wherein the reservoirs are provided in such locations as to prevent the electrically conductive mixture injected into the reservoirs from flowing out and spreading over the brushes, particularly the portions where the carbon brushes make sliding contact with the commutator segments, in order to maintain the brush performances.

It is the third object of this invention to provide a small electric motor wherein the use of conventional circuit components such as capacitors, etc. is replaced by application of an electrically conductive mixture to the intervening portions between each commutator segment to quench sparks generated between the brushes and the commutator segments, and thereby simplified fabricating works, reduced fabricating and material costs and higher productivity result.

Other objects, features and advantages of this invention will become apparent from the following description taken in conjection with the accompanying drawings.

BRIEF DESCRIPTION OF THE DRAWINGS

In FIGS. 1 and 2, reference numeral 1 refers to a rotary shaft of a motor rotor; 2 to an insulating cylinder integrally formed with synthetic resin, etc.; 3-1 through 3-3 to commutator segments, respectively; 4-1 through 4-3 to terminal portions of the commutator segments 3-1 through 3-3, respectively; 5-1 through 5-3 to reservoirs for holding an electrically conductive mixture; 6-1 through 6-3 to guide grooves of the commutator segment terminal portions 4-1 through 4-3, respectively; 7 to an insulating washer; 7-1 through 7-3 to projections of the insulating washer 7; 8 to an electrically conductive mixture injected into the reservoir 5-1.

In FIGS. 1 and 2 illustrating an embodiment of this invention where three commutator segments 3-1, 3-2 and 3-3 are used. The rotary shaft 1 of the motor rotor (not shown) in fixedly fitted into the central hole of the insulating cylinder 2 on which the commutator segments 3-1 through 3-3 are disposed at equal spacings. On the insulating cylinder 2, provided are annular guide grooves (not shown) for accommodating the commutator segments 3-1 through 3-3, the guide grooves 6-1 through 6-3 for accommodating the commutator segment terminal portions 4-1 through 4-3 and the reservoirs 5-1 through 5-3 into which the electrically conductive mixture 8 used in this invention is injected. After the commutator segments 3-1 through 3-3 are disposed on the insulating cylinder 2 in such a fashion as shown in FIGS. 1 and 2, the insulating washer 7 having an inside diameter to precisely fit to the surfaces of the commutator segments 3-1 through 3-3 and made of an electrically insulating material such as synthetic resin is fitted onto the commutator segments 3-1 through 3-3 to fixedly fit the commutator segments 3-1 through 3-3 to the insulating cylinder 2. The projections 7-1 through 7-3 corresponding to the intervening portions between the commutator segments 3-1 through 3-3 are formed on the insulating washer 7 as necessary to fit to the insulating cylinder 2. The reservoirs 5-1 through 5-3 are separated by the insulating washer 7 from the portions where the commutator segments 3-1 through 3-3 make sliding contact with the brushes (not shown). In the state shown in the figures, the electrically conductive mixture 8 is injected into each of the reservoirs 5-1 through 5-3. In the reservoirs 5-1 through 5-3, the electrically conductive mixture 8 is interposed between each of the commutator segments 3-1 through 3-3, including the intervening portions thereof. Selection of the electrical resistance of the electrically conductive mixture 8 within a proper range permits the commutator segments 3-1 through 3-3 to be bridged with an electrical resistance having a value within a proper range, whereby spark generation between the commutator segments and the brushes can be prevented and accordingly the electrical noises associated with sparks can be suppressed. Furthermore, there is no risk of the electrically conductive mixture 8 flowing out of the reservoirs 5-1 through 5-3 and adhering to the brushes since the reservoirs 5-1 through 5-3 are separated from the sliding contact portions of the brushes. There is no risk, therefore, that the electrically conductive mixture 8 adheres to the brushes to deteriorate their performances even when carbon brushes are used.

Figure 1:
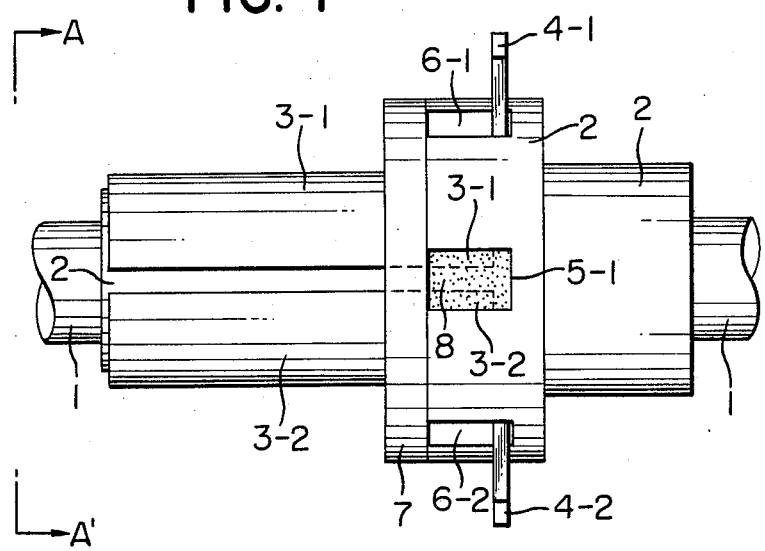
FIG. 1 is an enlarged side view of the commutator portion of a small electric motor embodying this invention.
Figure 2:
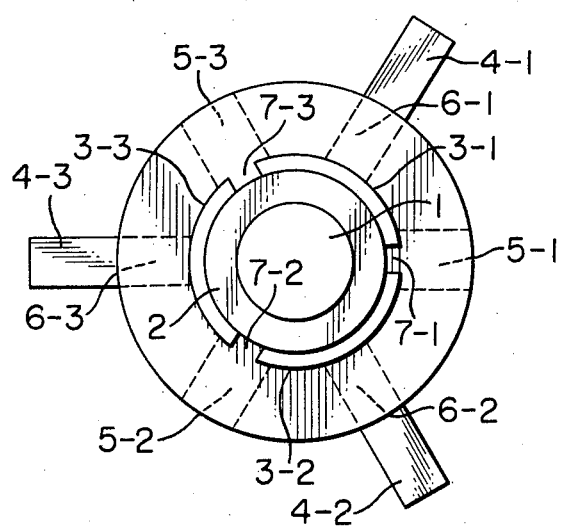
FIG. 2 a view taken in the direction of the arrows shown in FIG. 1.

Although the reservoirs 5-1 through 5-3 used in the embodiment shown in FIGS. 1 and 2 above have openings exposed to the outer periphery of the insulating cylinder 2, as is apparent from the figures, the reservoirs 5-1 through 5-3 may be of the enclosed construction or may have openings exposed to a different direction from that shown in the figures. In short, the reservoirs 5-1 through 5-3 may be of any construction, providing that the electrically conductive mixture 8 is effectively prevented from flowing out of the reservoirs 5-1 through 5-3 and adhering to the sliding contact portions of the commutator segments and the brushes, and providing that an electrical resistance bridge having a value within a proper range is formed between each of the commutator segments 3-1 through 3-3. The electrically conductive mixture 8 of any viscosity fit to the service condition of the motor can be used. In addition, the electrically conductive mixture 8 need not have lubricating properties.

Figure 3:
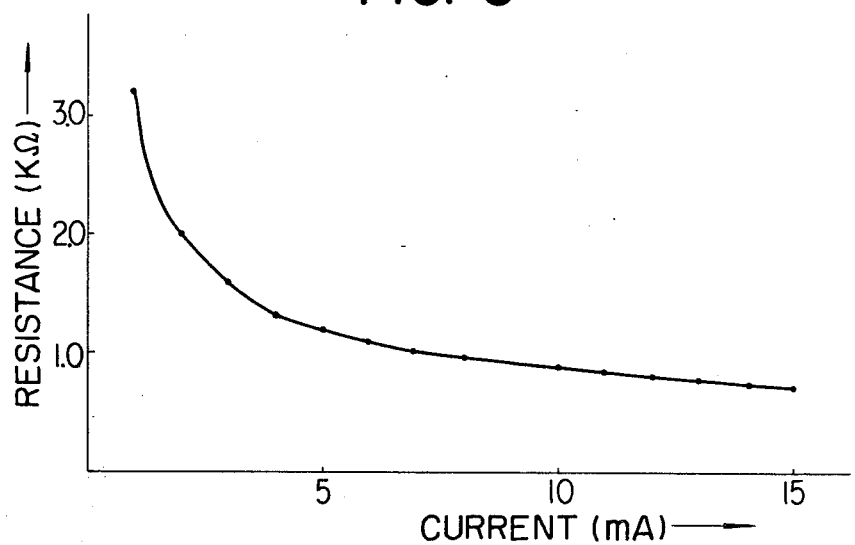
FIG. 3 is an explanatory diagram illustrating the electrical resistance characteristics of an electrically conductive mixture used in this invention.

The electrically conductive mixture used in this invention may be regarded as a mixture prepared by mixing one or more types of electrically conductive fine particles such as metallic powders, carbon or graphite with one or more types of oily substances and threading them into a butter-like mixture having a hard-to-flow viscosity. The electrically conductive mixture thus prepared has such a characteristic that the resistance value thereof varies with the current flowing therein, as shown in FIG. 3. The characteristic shown in FIG. 3 was obtained by the following measuring method. That is, a mixture prepared by mixing fine particles of graphite with naphthene base oil is injected into the reservoir 5-1 of the construction shown in FIG. 1, and a constant current source having current levels of 1 mA, 2 mA . . . . 15 mA is connected across the commutator segments 3-1 and 3-2 to measure the voltage V generated across the commutator segments 3-1 and 3-2. The resistance values calculated from the ratios of the voltages V to the current values are plotted in the figure.

The current-resistance characteristic shown in FIG. 3 varies with the size and type of electrically conductive fine particles, the type of oily substance with which the fine particles are mixed, and the mixing ratio. Needless to say, when electrically conductive fine particles are not mixed with oily substance, the resistance value of the fine particles is hardly dependent on the current flowing in the particles.

The current-resistance characteristic in which resistance decreases as current increases, as shown in FIG. 3 is favorable to prevent sparks from generating between commutator segments as the motor rotor rotates.

Figure 4:
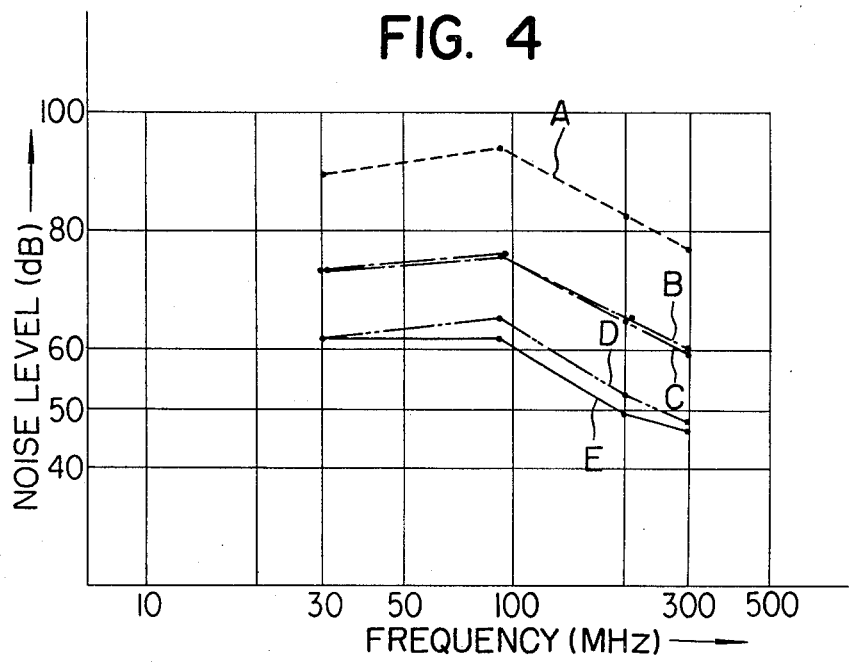
FIG. 4 is a diagram illustrating the state of electrical noise generation when the electrically conductive mixture of this invention is used.

FIG. 4 shows the measurement results of the level of electrical noises generated from the motor. The curve A in the figure represents the noise level when no particular spark quenching means is used across the commutator segments, the curve B represents the noise level when a 500-ohm fixed resistor is connected across the commutator segments, the curve C represents the noise level when a grease mixture prepared by mixing the so-called electrically conductive grease with a thickening agent is injected into the reservoirs 5-1 through 5-3 shown in FIG. 1, the curve D represents the noise level when the electrically conductive grease (without adding thickening agent) alone is injected into the reservoirs 5-1 through 5-3 shown in FIG. 1, and the curve E represents the noise level when a mixture prepared by mixing electrically conductive particles consisting of equal amounts of cupper fine particles and graphite fine particles with olefin base oil and thickening agent is injected into the reservoirs 5-1 through 5-3 shown in FIG. 1. Although not shown in the figure, the noise level when a resistance consisting of a sintered substance generally known as varister is connected across the commutator segment, as publicly known, is on the order of approximately 60 dB at 30 through 300 MHz. This means that the curves D and E exhibit excellent spark quenching performances quite comparable to that of varister.

The lower limit of the resistance value of the electrically conductive mixture used in this invention should be set within such a range that, when the electrically conductive mixture is injected into the reservoirs, the commutator segments are not unwantedly shortcircuited to deteriorate the motor efficiency. If decreased efficiency can be tolerated, however, the mixture may have a resistance value as low as the winding resistance across the commutator segments. Although the resistance value of the mixture should preferably be on the order of 0.1 to 5 k-ohms across the commutator segments in actual practice, that of 1 to 500 times the winding resistance across the commutator segments will generally serve the purpose.

As described in the foregoing, this invention makes it possible to quench sparks and suppress electrical noise associated with them by injecting an electrically conductive mixture into reservoirs and depositing the mixture on commutator segments. The process of injecting the mixture into the reservoirs is so simple that the process can be easily automated, resulting in remarkably improved productivity, reduced fabricating cost and uniform characteristics. That is, elimination of the need for spark quenching circuit components such as capacitors and varisters which are usually expensive and uneven in characteristics leads to a substantial decrease in costs and uniform characteristics. Furthermore, this invention can be applied to motors using carbon brushes because the reservoirs of this invention are disposed in such locations that the electrically conductive mixture does not adhere to the brushes. It is needless to say that a means to apply a lubricant on the commutator surface to prevent mechanical wear may be used in conjunction with the injection of the mixture into the reservoirs.

What is claimed is:

1. A small electric motor having a plurality of commutator segments disposed at equal spacings in the angular positional direction on an insulating cylinder fixedly fitted to a rotary shaft of a motor rotor, and brushes for making sliding contact with the commutator segments, wherein reservoirs for holding an electrically conductive mixture prepared by mixing electrically conductive fine particles with oily substance are provided by boring the insulating cylinder in such a manner that each reservoir extends to the adjoining commutator segments, and the electrically conductive mixture is injected into the reservoirs so that the mixture is deposited bridging each of the commutator segments.

2. A small electric motor as set forth in claim 1 wherein the electrically conductive mixture injected into the reservoirs forms desired resistance circuits across each commutator segments.

3. A small electric motor as set forth in claim 1 or 2 wherein the reservoirs are provided in the locations at which the commutator segments and the brushes do not contact.

4. A small electric motor as set forth in claim 1 wherein the electrically conductive mixture has an electrical resistance value within a range 1 to 500 times the electrical resistance of rotor coils to which the commutator segments are connected.

* * * * *